UNITED STATES PATENT OFFICE.

JOSEPH WILKINS, OF BALTIMORE, MARYLAND.

IMPROVEMENT IN TREATMENT OF WASTE FROM THE SEPARATION OF ANIMAL FROM VEGETABLE FIBERS.

Specification forming part of Letters Patent No. 202,910, dated April 23, 1878; application filed April 16, 1878.

*To all whom it may concern:*

Be it known that I, JOSEPH WILKINS, of the city of Baltimore, State of Maryland, have invented certain new and useful Improvements in Treatment of Waste from the Separation of Animal and Vegetable Fiber; and I hereby declare the same to be fully, clearly, and exactly described, as follows:

This invention relates to those processes for separating animal fiber, such as wool, from mixed fabrics, depending upon the disintegration of the vegetable fiber therein contained by the action of dilute acids, hydrochloric acid being the one usually employed. In carrying out these processes it has heretofore been customary to treat the rags, consisting of mixed fiber, with the acid by boiling and agitating them therein, resulting in the separation of the vegetable matter in the form of a fine fiber, of short staple, and generally of a dark color, due to the dye in the fabric. This material has heretofore been thrown aside as utterly worthless; but I have discovered that it is eminently adapted for the production of dextrine, glucose, and analogous substances.

The process I employ is as follows: Should the acid employed in disintegrating the rags of mixed fiber have been other than sulphuric, all traces of it are removed by thoroughly washing the vegetable residue from the process, which is then mixed with the proper proportion of sulphuric acid, diluted and heated, as in the ordinary process for making dextrine from cellulose. As soon as the solution of the vegetable matter is complete, chalk is added until the solution is neutral, and the liquid is decanted from the resulting precipitate of sulphate of lime.

The liquid consists of dextrine, only contaminated by certain coloring matters from the dye of the rags, which color is readily removed by treatment with animal charcoal and blood, or by filtration through a bone-black filter, as in the ordinary process of decolorizing saccharine solutions. Finally, the clear solution is evaporated, and the dextrine obtained in the ordinary commercial form.

While other acids may be used in producing dextrine from the waste, sulphuric is preferred, both on account of its cheapness and the facility of removing its excess by means of chalk. Obviously, by continuing the boiling with sulphuric acid, the dextrine at first formed will be converted into glucose, and this process may be pursued should it be desired to produce the latter product.

Having thus described my invention, what I claim as new, and desire to secure by Letters Patent, is—

1. The process herein described for converting into merchantable products the vegetable waste from the separation of animal from vegetable fiber, the said process consisting in treating the vegetable residue with acids for the production of dextrine or its derivatives, as described.

2. The process for converting the vegetable waste from the separation of animal from vegetable fiber into dextrine, the same consisting in heating the said material with sulphuric acid, neutralizing with chalk, decanting the solution, decolorizing, if necessary, and evaporating, as set forth.

JOS. WILKINS.

Witnesses:
S. D. WILLIAMS,
DAVID G. WEEMS.